(12) United States Patent
Gaiser

(10) Patent No.: US 9,046,308 B2
(45) Date of Patent: Jun. 2, 2015

(54) LATENT HEAT STORAGE DEVICE AND ASSOCIATED MANUFACTURING METHOD

(75) Inventor: Gerd Gaiser, Reutlingen (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 1184 days.

(21) Appl. No.: 12/838,951

(22) Filed: Jul. 19, 2010

(65) Prior Publication Data

US 2011/0016847 A1    Jan. 27, 2011

(30) Foreign Application Priority Data

Jul. 24, 2009  (DE) .......................... 10 2009 034 654

(51) Int. Cl.
| | | |
|---|---|---|
| F28D 17/00 | (2006.01) | |
| F28D 19/00 | (2006.01) | |
| F28F 7/00 | (2006.01) | |
| F28D 20/02 | (2006.01) | |
| F01N 5/02 | (2006.01) | |

(52) U.S. Cl.
CPC *F28D 20/02* (2013.01); *F01N 5/02* (2013.01); *F01N 2240/10* (2013.01); *Y02E 60/145* (2013.01); *Y02T 10/16* (2013.01); *F28F 2265/14* (2013.01)

(58) Field of Classification Search
CPC ..... F28D 19/042; F28D 19/044; F28D 20/02; F28D 20/021; F28D 21/0003; F28F 9/0236; F28F 9/0241; Y02E 60/145
USPC ..................................................... 165/10, 81
See application file for complete search history.

(56) References Cited

U.S. PATENT DOCUMENTS

| | | | | |
|---|---|---|---|---|
| 4,403,645 | A * | 9/1983 | MacCracken ................. | 165/10 |
| 5,007,478 | A * | 4/1991 | Sengupta ...................... | 165/10 |
| 5,305,821 | A | 4/1994 | Weingartner | |
| 5,477,676 | A * | 12/1995 | Benson et al. ............... | 60/274 |
| 6,615,906 | B1 * | 9/2003 | Fieback et al. ............... | 165/10 |
| 7,755,899 | B2 * | 7/2010 | Stenmark ..................... | 361/710 |
| 8,739,536 | B2 * | 6/2014 | Canal et al. .................. | 165/10 |
| 8,776,865 | B2 * | 7/2014 | Gaiser ........................... | 165/10 |
| 2009/0294094 | A1 * | 12/2009 | Suzuki et al. ................ | 165/10 |

FOREIGN PATENT DOCUMENTS

| | | |
|---|---|---|
| DE | 37 25 161 A1 | 2/1989 |
| DE | 40 21 492 A1 | 1/1992 |
| DE | 19937730 C1 | 7/2000 |
| DE | 103 32 162 A1 | 2/2005 |
| DE | 10 2004 052 106 A1 | 5/2006 |
| DE | 10 2004 052 107 A1 | 5/2006 |
| DE | 102004055475 B3 | 7/2006 |
| DE | 102006037760 A1 | 2/2008 |
| EP | 0116503 A1 | 8/1984 |
| EP | 0158378 A1 | 10/1985 |

* cited by examiner

*Primary Examiner* — Ljiljana Ciric

(74) *Attorney, Agent, or Firm* — Reinhart Boerner Van Deuren P.C.

(57) ABSTRACT

A latent heat storage device with at least one hollow space having a constant storage volume which contains a phase-changing material.
The material loading of the latent heat storage device can be reduced if the storage volume is so dimensioned that it consists of a basic volume which the phase-changing material assumes in the solidified state and an expansion volume which the phase-changing material additionally assumes in the molten state.

14 Claims, 2 Drawing Sheets

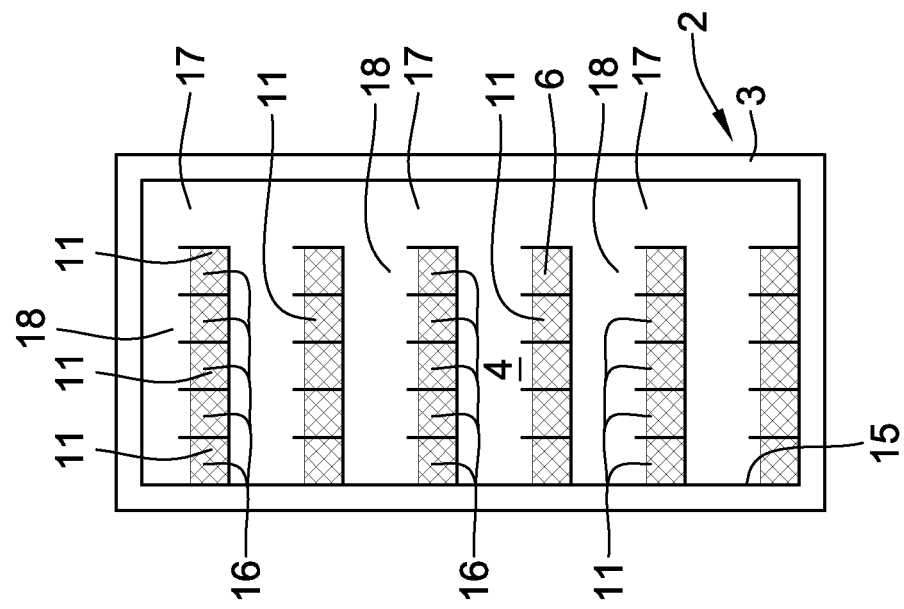
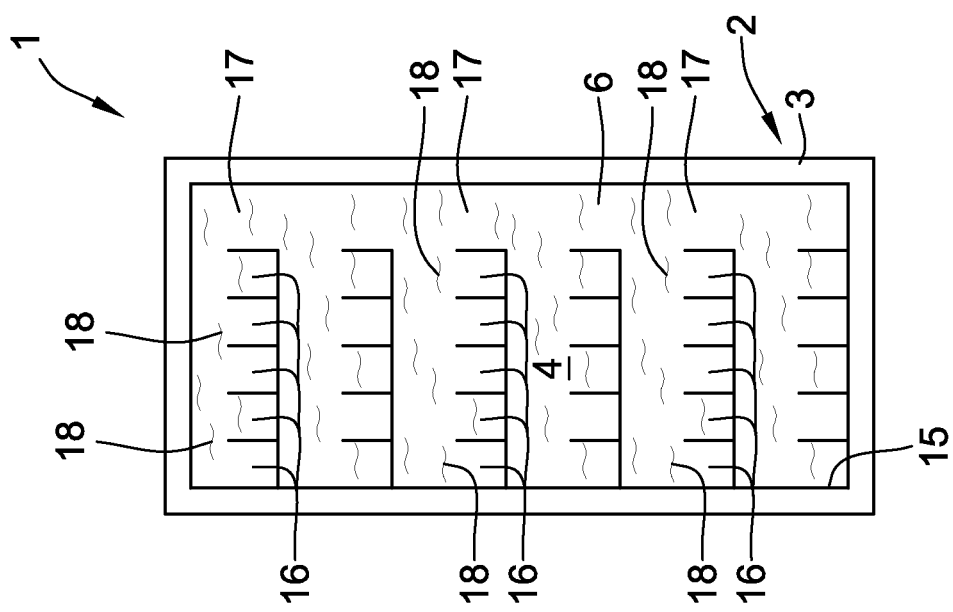

LATENT HEAT STORAGE DEVICE AND ASSOCIATED MANUFACTURING METHOD

CROSS-REFERENCE TO RELATED PATENT APPLICATIONS

This patent application claims the benefit of German Patent Application No. 10 2009 034 654.6, filed Jul. 24, 2009, the entire teachings and disclosure of which are incorporated herein by reference thereto.

FIELD OF THE INVENTION

The present invention relates to a latent heat storage device for an exhaust system of a combustion engine, more preferably of a motor vehicle. The invention additionally relates to a method for manufacturing such a latent heat storage device.

BACKGROUND OF THE INVENTION

From DE 10 2004 052106 A1 and from DE 10 2004 052107 A1 latent heat storage devices for exhaust systems of combustion engines are known which operate with a phase-changing material. Such a phase-changing material is characterized in that at the respective desired storage temperature it performs a phase change between liquid phase and solid phase. When charging the latent heat storage device the phase-changing material melts and thus assumes its liquid phase. When the latent heat storage device is discharged the phase-changing material solidifies, that is it assumes its solid phase. Phase-changing materials of this type are more preferably salts.

A central problem of such latent heat storage devices is the melt expansion of the phase-changing material during the respective phase change. This expansion can amount to between 5% and 20% depending on the material. Here, every melt process results in an expansion of the phase-changing material which on solidification results in a corresponding contraction. Such material expansions can lead to extreme loading of storage device spaces filled with the phase-changing material.

SUMMARY OF THE INVENTION

Embodiments of the present invention deal with the problem of stating an improved embodiment for a latent heat storage device or for an associated manufacturing method which is more preferably characterized in that the loading of the latent heat storage device through material expansions during the phase change is reduced.

According to the embodiments of the invention, this problem is solved through the subjects of the independent claims. Advantageous embodiments are the subject of the dependent claims.

Embodiments of the invention are based on the general idea of dimensioning a storage volume, which is present in a hollow space filled with the phase-changing material, in such a manner that it comprises both a basic volume, which the phase-changing material assumes in the solidified state, as well as an expansion volume, which the phase material in the molten state assumes in addition to the basic volume. In other words, the storage volume provided in the respective hollow space already takes into account the material expansion upon the melting of the phase-changing material. Because of this, expansion loading of a housing forming the hollow space can be substantially reduced during the melting process.

Particularly advantageous is an embodiment wherein the expansion volume on the one hand takes into account the melt expansion of the phase-changing material and on the other hand also a temperature expansion of the phase-changing material which the liquid phase-changing material undergoes pending the reaching of a predetermined maximum operating temperature of the latent heat storage device. This embodiment takes into account the realisation that the phase-changing temperature, that is the melting temperature of the phase-changing material, is usually below the usual operating temperatures of the latent heat storage device. In order to limit excessive stress loading of the body defining the hollow space to permissible values even pending the reaching of the maximum operating temperature of the latent heat storage device, the corresponding consideration of the thermal expansion of the liquid phase-changing material takes place in the volume.

In addition or alternatively the expansion volume with another embodiment can take into account a predetermined maximum operating pressure in the respective hollow space which the liquid phase-changing material is allowed to generate in the hollow space at a predetermined maximum operating temperature of the latent heat storage device. This measure also results in an optimization of the expansion volume and thus the storage volume in order to reduce or limit to permissible values the stress loading of the body forming the hollow space.

The respective hollow space can be configured tight according to another embodiment. In addition, the expansion volume can be selected so that upon solidification of the phase-changing material a vacuum is formed in the hollow space. According to an advantageous further development this vacuum can now be specifically set so that in the liquid phase-changing material a predetermined operating pressure materialises when the latent heat storage device is operated in its usual operating temperature range. Such configuration is more preferably of advantage if the operating temperatures of the latent heat storage device are comparatively high and for example boiling in the liquid phase-changing material is to be avoided.

According to another advantageous embodiment the respective hollow space can be configured or designed in such a manner that the solidification of the phase-changing material occurs in spatially distributed microzones so that in the solidified state the basic volume and the expansion volume are mixed.

This design has the advantage that when melting the phase-changing material the material expansion occurs spatially distributed throughout the storage volume. Because of this, the development of local excess pressures or critical stress conditions can be reduced or avoided. Such critical states can occur for example when during the melting of the phase-changing material first regions melt earlier than second regions and when the second regions block an expansion of the first regions. Through the solidification in spatially distributed microzones melting in these microzones thus occurs spatially distributed as well. The development of enclosed melting regions can thus be avoided or reduced.

According to a further development the respective hollow space can comprise a capillary structure for this purpose, which upon solidification generates the spatially distributed microzones. In the respective hollow space the capillary forces can ensure that the liquid phase-changing material remains spatially distributed even with falling temperatures and more preferably upon solidification.

In addition or alternatively such spatially distributed microzones can also be created in that a plurality of hollow sub-spaces are formed in the respective hollow space which are connected with one another in a communicating manner via narrow points and/or via redirecting points. In addition or alternatively it can also be provided that the respective hollow space is furnished with a surface structure on its walls which improves wetting with the liquid phase-changing material. By means of this flowing-together of the liquid phase-changing material upon solidification can also be inhibited or prevented.

Additional important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

It shows, in each case schematically

FIG. 4 is a sectional views as in FIG. 1, however with a further embodiment in the liquid state (a) and in the solid state (b).

Figure 1:
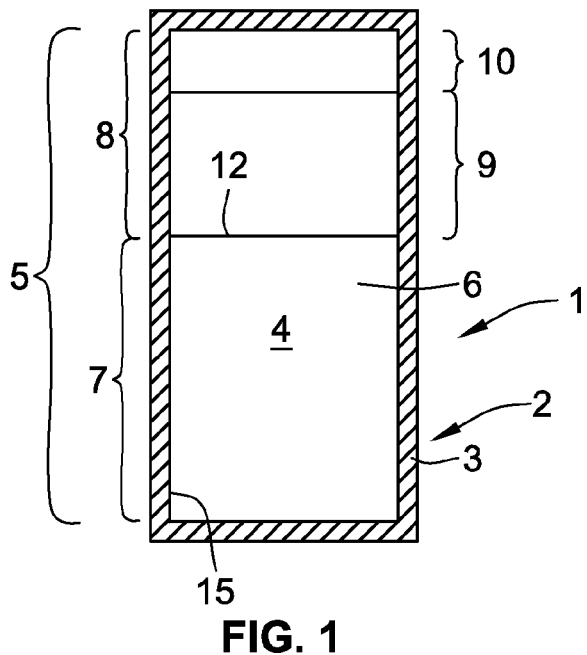
FIG. 1 is a highly simplified sectional representation of a latent heat storage device.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to FIGS. 1-4 a latent heat storage device 1, which is used in an exhaust system of a combustion engine which is not shown and which can preferably be located in a motor vehicle, comprises a housing 2 whose walls 3 enclose at least one hollow space 4. In the example, only one single hollow space 4 each is shown. It is clear that in principle a plurality of such hollow spaces 4 can also be included in the housing 2 or in the latent heat storage device 1. Here, the respective hollow space 4 comprises or defines a storage volume 5 marked with braces which contains a phase-changing material 6. This means that the hollow space 4 or its storage volume 5 is more or less filled with the phase-changing material 6.

According to FIG. 1, the storage volume 5 is so dimensioned that it comprises a basic volume 7 marked by a brace and an expansion volume 8 marked by a brace. In other words, the basic volume 7 and the expansion volume 8 jointly form the storage volume 5. The basic volume 7 is formed through the volume that is assumed by the phase-changing material 6 in its solidified state. Here, the basic volume 7 can take into account the maximum thermal expansion of the phase-changing material 6 in its solid phase which as a rule occurs at the solidification temperature. In contrast with this, the expansion volume 8 takes into account the volume that is additionally assumed by the phase-changing material 6 in the molten state. During the phase transition from solid to liquid the phase-changing material 6 expands. This material expansion is captured by the expansion volume 8. The ratios of basic volume 7 to expansion volume 8 are shown in exaggerated size in FIG. 1. Usually the expansion volume 8 is between 5% and 20% of the basic volume 7. These figures are purely exemplary here.

According to FIG. 1, the expansion volume 8 can now take into account a melt expansion 9 of the phase-changing material 6 marked with a brace and on the other hand a temperature expansion 10 of the phase-changing material 6 marked with a brace. The melt expansion 9 is obtained during the phase transition, that is at the melt temperature of the phase-changing material 6. Based on a volume applicable to the phase-changing material 6 at its melting temperature the liquid phase-changing material 6 can further expand with increasing temperature. The temperature expansion 10 now takes into account the increase in volume of the liquid phase-changing material 6 that is obtained when the liquid phase-changing material 6 reaches a predetermined maximum operating temperature of the latent heat storage device 1. For example, the latent heat storage device 1 can be designed for a maximum exhaust temperature of 400° C. The usual operating temperature of the latent heat storage device 1 in this case can be within an operating temperature range from 350 to 380° C. Here, the numerical values are also to be understood only exemplarily. By taking into account the temperature expansion 10 the loading of the housing 2 can be limited to permissible values even on reaching of the maximum operating temperature.

In addition it is possible in principle to select the expansion volume 8 so that a predetermined maximum operating pressure is additionally taken into account in the respective hollow space 4. The housing 2 can be designed up to a predetermined maximum operating temperature which for example can be around 10 bar. The expansion volume 8 is now calculated so that at the predetermined maximum operating temperature of the latent heat storage device 1 the aforementioned maximum permissible operating pressure in the liquid phase-changing material 6 within the hollow space 4 is obtained.

In order to be able to realize differential pressures between the hollow space 4 and an environment of the housing 2 which is not designated in any detail without leakage, the housing 2 or the respective hollow space 4 are embodied suitably tight. With a tight hollow space 4 the expansion volume 8 with another embodiment can also be specifically selected so that with solidified phase-changing material 6 a vacuum is formed in the hollow space 4. Through suitable calculation of the expansion volume 8 this vacuum can be specifically realized. For example a vacuum can be set in the hollow space 4 for the solidified phase-changing material 6 which is dimensioned so that with liquefied phase-changing material 6 a predetermined operating pressure materialises in the phase-changing material 6 which is above the ambient pressure. More preferably the vacuum, which materialises in the hollow space 4 with solidified phase-changing material 6 can be so designed or dimensioned that the aforementioned predetermined operating pressure, which is to be present in the liquid phase-changing material 6, is present when the latent heat storage device 1 is operated in its predetermined operating temperature range. Through such a configuration the thermal expansion effects which usually occur in operation of the latent heat storage device 1 can be completely taken into account as a result of which minimal loading of the material used for the housing 2 or for its walls 3 is obtained.

Figure 2A:
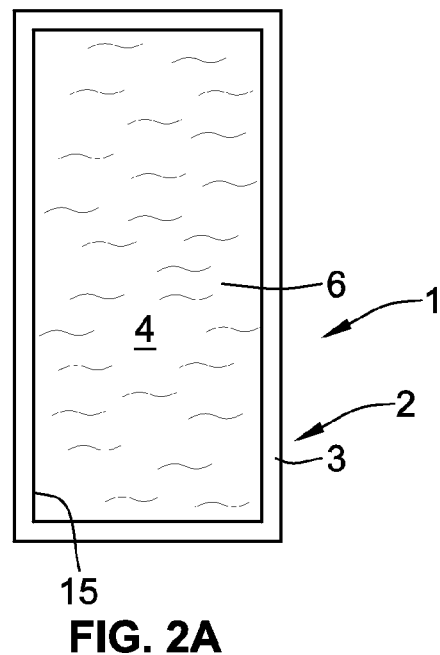
FIG. 2 is sectional views as in FIG. 1 in the liquid state (a) and in the solid state (b)
Figure 2B:
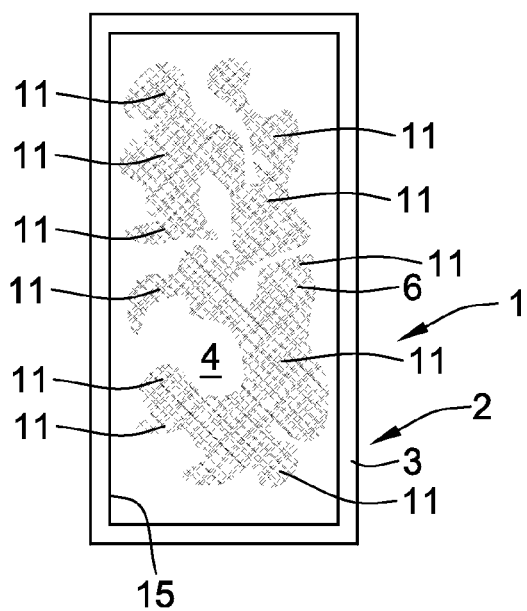

FIG. 2a shows a state wherein the phase-changing material 6 is completely liquefied. With corresponding design of the storage volume 5 the entire hollow space 4 is filled out by the liquid phase-changing material 6. Preferably the hollow space 4 is now so configured or designed that the solidification of the phase-changing material 6 takes place in spatially distributed microzones 11 according to FIG. 2b. According to FIG. 2b the basic volume 7 and the expansion volume 8 are mixed and distributed over the hollow space 4 in the solidified state. More preferably, the layering or division indicated in FIG. 1 by a line 12 is to be avoided, wherein a part of the hollow space 4 is completely filled with a solid block of solidified phase-changing material 6, while the remainder of the hollow space 4 is empty. The spatially distributed microzones 11 of the solidification of the phase-changing material 6 result in corresponding spatially distributed melting zones during the melting of the phase-changing material 6. More preferably, encapsulation of melting zones within solidified regions of the phase-changing material 6, which can lead to damage of the housing 2, can be avoided.

Figure 3:
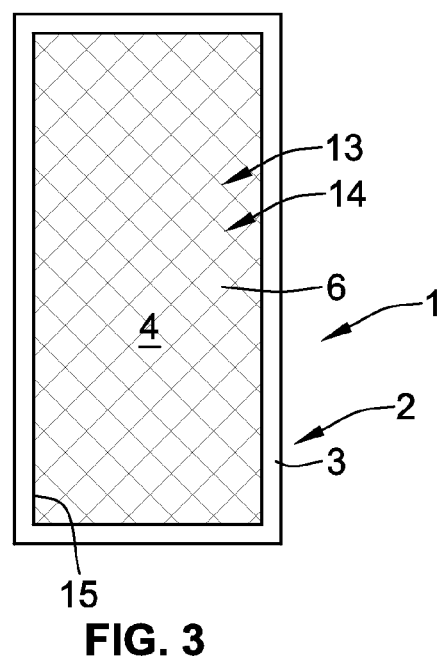
FIG. 3 is a sectional view as in FIG. 1, however with another embodiment.

In order to achieve such spatial distribution of micro-solidification zones 11 during the solidification of the phase-changing material 6 the hollow space 4 according to FIG. 3 can be equipped with a capillary structure 13 for example. Such a capillary structure 13 can for example be realised by means of a spatial structure 14 filling out the hollow space 4, which structure has a sponge-like effect with respect to the phase-changing material 6. For example, this structure 14 can consist of a porous material and be characterized by an extremely large surface. In addition or alternatively it is possible to equip the walls 3 of the housing 2, which enclose the hollow space 4, with a surface structure 15 which makes possible improved adhesion or wetting of the liquid phase-changing material 6. Because of this, flowing-together of the phase-changing material 6 during solidification can be inhibited, which favours the formation of the spatially distributed micro-solidification zones 11.

FIGS. 4a and 4b show purely exemplarily an embodiment wherein the respective hollow space 4 comprises a multiplicity of hollow sub-spaces 16 which are connected with one another in a communicating manner via redirecting points 17 or via narrow points 18. In FIG. 4a the entire hollow space 4 is filled out by the liquefied phase-changing material 6. On solidification, the phase-changing material collects in the hollow sub-spaces 16, wherein the redirecting points 17 or the narrow points 18 then inhibit merging of the phase-changing material 6 between the hollow sub-spaces 16. Because of this, the micro-solidification zones 11 are formed within the hollow sub-spaces 16. Upon liquefication the phase-changing material 6 can expand within the individual hollow sub-spaces 16 without obstruction, without damage to the housing 2 occurring in the process.

The latent heat storage device 1 presented here can be produced in different manners. Preferred is a filling method wherein the phase-changing material 6 in the solidified state is introduced in the respective hollow space 4 as bulk or in form of at least one prefabricated shaped body. The hollow space 4 can then be subjected to a predetermined vacuum and sealed in this evacuated state. Because of this it is achieved that the expansion volume 8 already takes into account the vacuum mentioned earlier which is to be present in the hollow space 4 with solidified phase-changing material 6.

With an alternative embodiment it is possible to initially melt the solidified phase-changing material 6 introduced as bulk or as shaped body within the respective hollow space 4 in order to subsequently seal the hollow space 4 with liquefied phase-changing material 6. Here, the temperature of the liquid phase-changing material 6 can be matched to the operating temperature range of the latent heat storage device 1 or to the maximum operating temperature of the latent heat storage device 1.

Alternatively it is likewise possible to fill the phase-changing material 6 into the respective hollow space 4 in the liquefied state in order to subsequently seal the hollow space 4 with the liquid phase-changing material 6. Here, too the operating temperature ranges or maximum operating temperatures of the latent heat storage device 1 as well as the pressures to be expected in operation can be taken into account.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A latent heat storage device for an exhaust system of a combustion engine, comprising:
   a housing that defines at least one hollow space, the at least one hollow space having a constant storage volume;
   a phase changing material contained within the at least one hollow space, the phase changing material having a first volume when in a solid state and a second volume larger than the first volume when in a molten state; and
   wherein the constant storage volume that is so dimensioned so as to consist of a basic volume corresponding to the first volume of the phase-changing material and an expansion volume corresponding to an increase in volume from the first volume to the second volume.

2. The latent heat storage device according to claim 1, wherein the latent heat storage device has a predetermined maximum operating temperature; and
   wherein the expansion volume is sized to receive a melt expansion of the phase-changing material and a temperature expansion of the phase-changing material at the predetermined maximum operating temperature of the latent heat storage device.

3. The latent heat storage device according to claim 1, wherein the latent heat storage device has a predetermined maximum operating temperature; and
   wherein the expansion volume accommodates a maximum operating pressure which the phase-changing material generates in the molten state at the predetermined maximum operating temperature of the latent heat storage device.

4. The latent heat storage device according to claim 1, wherein the at least one hollow space is sealed to form a vacuum therein.

5. The latent heat storage device according to claim 4,
   wherein the expansion volume is so dimensioned such that with the phase-changing material in a solid state the vacuum is obtained, and such that with the phase-changing material in the molten state a predetermined operating pressure is formed.

6. The latent heat storage device according to claim 5,
   wherein the predetermined operating pressure is formed at a predetermined operating temperature range of the latent heat storage device.

7. The latent heat storage device according to claim 1, wherein the at least one hollow space is so configured to allow the phase-changing material upon solidification to be disposed in spatially distributed microzones, such that the basic volume and the expansion volume of the solidified phase-changing material are intermixed.

8. The latent heat storage device according to claim 7, wherein upon solidification of the phase changing material the respective hollow space comprises a capillary structure creating the spatially distributed microzones.

9. The latent heat storage device according to claim 7, wherein the respective hollow space consists of a plurality of hollow sub-spaces, which are connected with one another in a communicating manner via one of redirecting points and narrow points.

10. The latent heat storage device according to claim 7, wherein the respective hollow space on its walls comprises a surface structure that improves the wetting with the phase-changing material in the liquid state.

11. The latent heat storage device according to claim 7, wherein the respective hollow space comprises a spatial structure; and wherein the phase-changing material in the liquid state has a sponge-like effect.

12. A method for the filling of a latent heat storage device for an exhaust system of a combustion engine, comprising:
   providing a phase-changing material that in a first state is solid and in a second state is molten;
   providing a housing to define at least one hollow space having a constant storage volume, the storage volume configured to contain the phase-changing material, wherein the constant storage volume is so dimensioned so as to consist of a basic volume, which the phase-changing material fills in the first state, and an expansion volume, which the phase-changing material additionally fills in the second state,
   filling the basic volume of the at least one hollow space with the phase-changing material in the first state as one of bulk or as at least one shaped body;
   creating a vacuum in the at least one hollow space; and
   sealing the at least one hollow space.

13. A method for the filling of a latent heat storage device for an exhaust system of a combustion engine, comprising:
   selecting a phase-changing material that in a first state is solidified and is transitionable into a second molten state;
   fixing a housing to surround at least one hollow space having a constant storage volume;
      wherein the constant storage volume is so dimensioned so as to consist of a basic volume of the phase-changing material in a solidified state and an expansion volume for a molten state of the phase changing material;
   filling the basic volume of the at least one hollow space with the phase-changing material in the solidified state as one of bulk or as at least one shaped body;
   melting the phase-changing material within the at least one hollow space; and sealing the at least one hollow space.

14. A method for the filling of a latent heat storage device for an exhaust system of a combustion engine, comprising:
   selecting a phase-changing material that in a first state is solidified and is transitionable into a second molten state;
   fixing a housing to surround at least one hollow space, the at least one hollow space having a constant storage volume;
      wherein the constant storage volume is so dimensioned so as to consist of a basic volume of the phase-changing material and an expansion volume for the molten state of the phase changing material;
   filling the basic volume of the at least one hollow space with the phase-changing material in the liquid state; and
   sealing the at least one hollow space.

* * * * *